No. 821,231. PATENTED MAY 22, 1906.
R. R. FREY.
GANG PLOW DRAFT HITCH.
APPLICATION FILED JAN. 29, 1906.
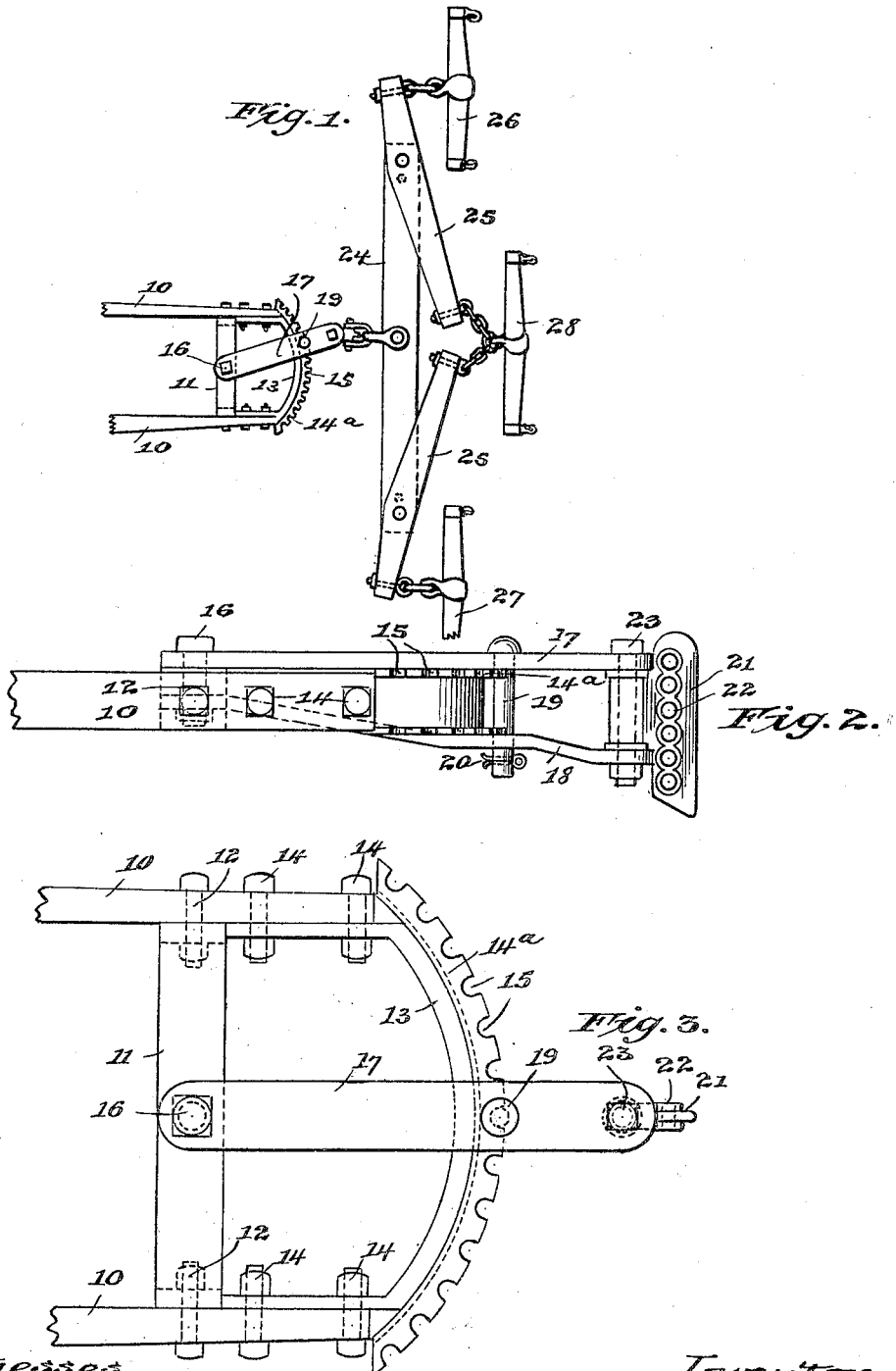

UNITED STATES PATENT OFFICE.

ROBERT R. FREY, OF DIXON, ILLINOIS, ASSIGNOR TO GRAND DETOUR PLOW COMPANY, OF DIXON, ILLINOIS, A CORPORATION OF ILLINOIS.

GANG-PLOW DRAFT-HITCH.

No. 821,231.     Specification of Letters Patent.     Patented May 22, 1906.

Application filed January 29, 1906. Serial No. 298,521.

*To all whom it may concern:*

Be it known that I, ROBERT R. FREY, a citizen of the United States, residing at Dixon, in the county of Lee and State of Illinois, have invented certain new and useful Improvements in Gang-Plow Draft-Hitches, of which the following is a specification.

My invention relates to improvements in the construction of draft-hitches for plows, more especially gang-plows, and comprises means for securing a central draft or pull on a cross-bar between the plow-beams. In order to provide for the accommodation of different numbers of horses and the proper adjustment of the evener and to adjust the plow to and from the land, I employ a U-shaped spreader or bar fastened to the ends of the plow-beams, and secured to this spreader concentric with the point of attachment of the draft-bars to the cross-bar is a notched channel-bar, with the notches of which coöperates a pin or bolt to maintain the draft-bars in proper position.

I have illustrated my invention in detail in the accompanying drawings, wherein—

Figure 1 is a plan view of the front portion of a gang-plow and an evener or equalizer attached thereto to accommodate three horses. Fig. 2 is a side elevation of the front portion of a plow employing my improved draft mechanism, and Fig. 3 is a plan view of the structure illustrated in Fig. 2.

Between the plow-beams 10 and a little distance back from their front ends is provided a cross-bar 11, secured to the plow-beams by bolts 12 12. The forward portions of the two plow-beams are held apart and braced by a U-shaped spreader 13, the central portion of which is curved concentric with the point of the cross-bar midway between the plow-beams. By means of bolts 14 the legs or inner ends of spreader 13 are fastened to the inner sides of the plow-beams, as is clearly illustrated in Fig. 3. Secured to the outer surface of the curved portion of spreader 13 is a curved channel-bar 14ª, its flanges extending forwardly and notched at 15, as indicated. Pivoted on a bolt 16 at the middle point of cross-bar 11 are two draft-bars 17 and 18, which pass above and below concentric bar 14, respectively. Draft-bars 17 and 18 are adjustable laterally by turning on their pivot-bolt 16 and are held in adjusted position by a pin 19, passing through apertures therein and adapted to fit in any of the notches 15. At its lower end pin 19 is supplied with a transverse cotter-pin 20 to prevent displacement of the same. At the forward end of draft-bars 17 and 18 is a clevis 21, provided with a series of vertical holes 22 and pivoted on a bolt 23, passing through both draft-bars.

By shifting draft-bars 17 and 18 on their pivot-bolt 16 the drift of the plow in the ground in either direction may be adjusted to suit any condition. It should be noted that the forward pull of the plow occurs wholly on bolt 16 at the central point of cross-bar 11, there being no forward pull whatever on the bolt 19 or curved bar 14ª. By means of this lateral adjustment of the draft-bars an evener to accommodate any number of horses may be properly attached to the plow, the horses being so spaced that they travel in their proper positions, either in the furrow or on the land. In Fig. 1 I have shown the draft-bars shifted to one side so as to accommdate three horses, the evener or equalizing-bar 24 being attached to the clevis 21 and having pivoted at its opposite ends eveners 25, to the outer ends of which are connected the swingletrees 26 and 27 and to the inner ends of which is connected the swingletree 28. If it is desired to use four or five horses to draw the plow, then the bars 17 and 18 are shifted laterally so that the horses will be in their proper positions.

It will be apparent that by my invention the drift of the plow sidewise may be readily varied by shifting the draft-bars, and the draft-bars may be adjusted for the attachment of eveners of different numbers of horses, the forward pull of the plow always being at the central point 16, which is midway between the plow-beams and the plow-shares.

My invention is not limited to the details of construction as shown and described; but the device illustrated and set forth in this specification may be varied to a considerable extent in its details without departing from the substance of my invention as defined by the claims.

I claim—

1. In a device of the character described, the combination of spaced plow-beams, a cross-bar connecting said plow-beams, a draft-bar pivotally secured to said cross-bar midway between said plow-beams and adjustable laterally on the pivot, and means to maintain said draft-bar in adjusted position, substantially as described.

2. In a device of the character described, the combination of parallel plow-beams, a cross-bar connecting said plow-beams, a draft-bar pivotally secured to said cross-bar midway between said plow-beams and laterally adjustable on the pivot, a notched bar at the forward end of said plow-beams, and a pin coöperating with said draft-bar and notched bar to maintain said draft-bar in adjusted position, substantially as described.

3. In a device of the character described, the combination of parallel plow-beams, a cross-bar connecting said plow-beams, a draft-bar pivotally secured to said cross-bar midway between said plow-beams and laterally adjustable on the pivot, a curved bar at the forward end of said plow-beams concentric with the pivotal point of said draft-bar, said curved bar having notches on its front portion, and a pin coöperating with said draft-bar and the notches of said curved bar to maintain said draft-bar in adjusted position, substantially as described.

4. In a device of the character described, the combination of parallel plow-beams, a cross-bar connecting said plow-beams, a draft-bar pivotally secured to said cross-bar midway between said plow-beams and laterally adjustable on its pivot, a brace secured to the forward ends of said plow-beams, the central portion of said brace being curved concentric with the pivotal point of said draft-bar, a curved bar secured to the curved forward face of said brace, said curved bar having notches on its front portion, and a pin coöperating with said draft-bar and curved notched bar to maintain said draft-bar in adjusted position, substantially as described.

5. In a device of the character described, the combination of parallel plow-beams, a cross-bar connecting said plow-beams, a draft-bar pivotally secured to said cross-bar midway between said plow-beams and laterally adjustable on its pivot, a U-shaped brace, the legs of said brace being connected to the plow-beams in front of said cross-bar and the central portion of said brace being curved concentric with the pivot of said draft-bar, a channel-bar secured to said brace and concentric to said draft-bar pivot, the flanges of said channel-bar being notched and extended forwardly, and a pin coöperating with said draft-bar and the notches of said curved channel-bar to maintain said draft-bar in adjusted position, substantially as described.

ROBERT R. FREY.

Witnesses:
HENRY T. NOBLE.
EDW. E. DAVIS.